United States Patent [19]

Numazawa et al.

[11] Patent Number: 5,718,449
[45] Date of Patent: Feb. 17, 1998

[54] SIDE-IMPACT AIRBAG DEVICE

[75] Inventors: Akio Numazawa; Masahiro Tanabe, both of Niwa, Japan

[73] Assignee: Kabushiki Kaisha Tokai-Rika-Denki-Seisakusho, Nagoya, Japan

[21] Appl. No.: 535,334

[22] Filed: Sep. 28, 1995

[30] Foreign Application Priority Data

Nov. 21, 1994 [JP] Japan ................... 6-286880

[51] Int. Cl.⁶ ............................................. B60R 21/22
[52] U.S. Cl. ........................... 280/730.2; 280/743.1
[58] Field of Search ..................... 280/730.1, 730.2, 280/743.1, 743.2, 729, 748, 751

[56] References Cited

U.S. PATENT DOCUMENTS

| | | | |
|---|---|---|---|
| 3,731,949 | 5/1973 | Radke . | |
| 3,791,667 | 2/1974 | Haviland . | |
| 5,308,112 | 5/1994 | Hill et al. | 280/730.2 |
| 5,316,336 | 5/1994 | Taguchi et al. | 280/730.2 |
| 5,324,072 | 6/1994 | Olson et al. | 280/730.2 |
| 5,439,247 | 8/1995 | Kolb | 280/730.2 |
| 5,447,326 | 9/1995 | Laske et al. | 280/730.2 |

FOREIGN PATENT DOCUMENTS

| | | | |
|---|---|---|---|
| A-0 590 845 | 4/1994 | European Pat. Off. . | |
| A-22 22 621 | 11/1972 | Germany . | |
| 4301193 | 8/1993 | Germany | 280/730.2 |
| A-43 01 193 | 8/1993 | Germany . | |
| A-6-64492 | 3/1994 | Japan . | |
| 2 267 065 | 11/1993 | United Kingdom . | |

*Primary Examiner*—Paul N. Dickson
*Attorney, Agent, or Firm*—Oliff & Berridge

[57] ABSTRACT

A side-impact airbag device capable of being located in a narrow and restricted position and promptly and sufficiently inflating an airbag to a predetermined range even if a part such as an arm rest or the like is provided. An airbag body is disposed so as to be spread over a side wall such as a side door or the like. Predetermined portions of the airbag body, which correspond to the part such as the arm rest or the like attached to the side door, are bonded to one another so that the predetermined portions are prevented from inflating due to the introduction of gas therein. An inflator is used to inflate the entirety of the airbag body on the average.

25 Claims, 4 Drawing Sheets

SIDE-IMPACT AIRBAG DEVICE

BACKGROUND OF THE INVENTION

1. Field of the Invention

The present invention relates to a side-impact airbag device attached to a side wall such as a side door or the like corresponding to a side of a vehicle seat and inflated when a predetermined acceleration or load is applied to the vehicle side.

2. Description of the Related Art

A front-impact airbag device has heretofore been known which is expanded and inflated when a large deceleration or load is applied in a vehicle traveling direction. There is also known a vehicle sideface-impact airbag device which is inflated when a large acceleration or load is applied in a vehicle side direction.

Since the vehicle sideface-impact airbag device needs to ensure a wide vehicle-interior space, an airbag body thereof is accommodated within a door in a folded state. This type of airbag device has a problem that since the folded airbag body increases in thickness, other parts employed in the airbag device must be reduced in size.

To solve these problems, a side-impact airbag system whose airbag body is arranged in the already-unfolded state, has been described in GB Publication No. 2,267,065A.

As shown in FIG. 4, this side-impact airbag system 52 comprises a gas generator 53 which is aligned parallel to the bottom edge of the door, and an already unfolded airbag body 54 arranged approximately in the set position which it is intended to adopt in the event of an accident involving a side impact. The airbag body 54 is accordingly arranged virtually in the state ready for use. Therefore, the airbag body 54 comes into effect without delay when gas is introduced.

Since, however, interior mounting parts such as various switches, an arm rest, a door glass up-and-down handle, etc. are provided on the interior side of the door, the side-impact airbag system must be disposed away form the interior mounting parts. Accordingly, the side-impact airbag system has a problem that the placement of the airbag in an optimum occupant protection position falls into difficulties and a range for expanding the airbag becomes narrow.

SUMMARY OF THE INVENTION

With the foregoing in view, it is therefore an object of the present invention to provide a side-impact airbag device capable of eliminating the need of a large space for accommodating an airbag body therein and preventing a reduction in range for expanding and inflating an airbag even if interior mounting parts are provided.

According to a first aspect of the present invention, there is a provided a side-impact airbag device comprising an airbag body disposed on an interior-side surface of a vehicle side wall in an expanded/contracted state, and an uninflatable portion formed in the airbag body and disposed between an interior mounting part attached to the vehicle side wall and the interior-side surface of the vehicle side wall.

According to the first aspect of the present invention, when a large acceleration or load is applied from a vehicle side, inflating gas is injected from an inflator or the like so as to be introduced into the airbag body. The inflating gas inflates the airbag body while bypassing the uninflatable portion. Further, since the airbag body can be inflated on both sides of the interior mounting part, the airbag body can be expanded over a wide range toward the vehicle side wall. Therefore, even if a space for accommodating the airbag body therein is small and the interior mounting part is provided, the airbag device can be obtained which is capable of preventing a range for developing and inflating the airbag from being narrowed.

The following are considered as embodiments in this case. The uninflated portion can be disposed between an interior surface-side end of the interior mounting part and the interior-side surface of the vehicle side wall. Further, the uninflated portion may be provided at a portion at which members for mounting the interior mounting part penetrate the airbag body. Furthermore, the airbag body may include passages for allowing the inflating gas to pass from one side of the airbag body to the other side thereof. The passages can be provided adjacent to the uninflated portion. By providing the passages adjacent to the uninflated portion, the airbag inflating range can be provided over a wide zone without setting the airbag body to a special shape. A cover for covering the airbag body may further be provided. In this case, the cover can be formed as an inner liner for a side door of a vehicle.

According to a second aspect of the present invention, there is provided a method of mounting the side-impact airbag device to the interior-side surface of the vehicle side wall, which comprises the steps of preparing the interior mounting part attached to the vehicle side wall at a predetermined position on the inner liner, penetrating the members for mounting the interior mounting part into the inner liner and the uninflatable portion, installing the interior mounting part on the vehicle side wall, and fixing the airbag body to the interior-side surface of the vehicle side wall.

According to the second aspect of the present invention, the side-impact airbag device can be attached to a vehicle so that its intrinsic function can be exhibited.

The contents of the present invention, which have been described above will become easy to more apparently understand from the following description.

BRIEF DESCRIPTION OF THE DRAWINGS

In the accompanying drawings.

DETAILED DESCRIPTION OF THE PREFERRED EMBODIMENTS

[First embodiment]

Figure 1:
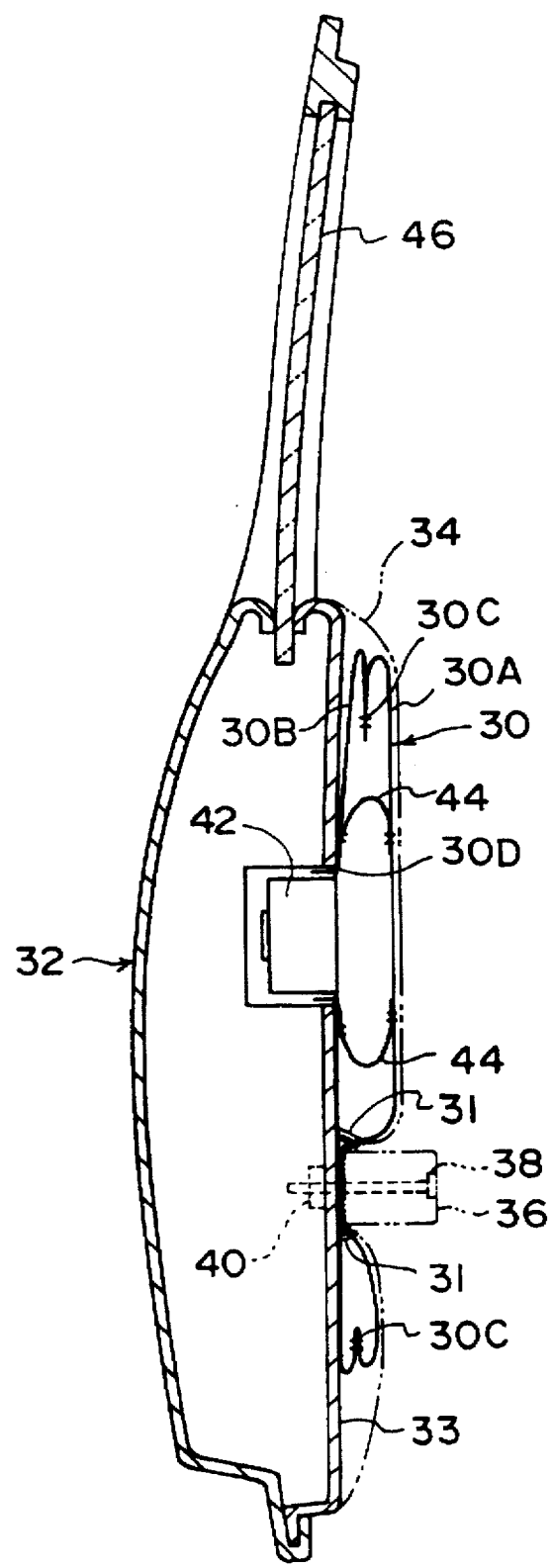
FIG. 1 is schematic cross-sectional view showing the state of attachment of a side-impact airbag device according to a first embodiment of the present invention to a side door and corresponding to a view taken along line I—I of FIG. 2.

A first embodiment of a side-impact airbag device according to the present invention will hereinafter be described with reference to FIGS. 1 and 2.

An airbag body 30 employed in the present embodiment is provided on an interior-side surface of a door innerpanel 33 of a side door 32 and is covered with an inner liner 34 such as a door trim or the like. The airbag body 30 may be provided on the interior side of the inner liner 34 so as to be in an state exposed toward the interior or covered with a cover or the like.

The airbag body 30 has a substantially-rectangular fabric 30A provided on the interior side and a substantially-rectangular fabric 30B provided on the exterior side, which form a bag by sewing their peripheries 30C each other. The sewn peripheries 30C are disposed inside the airbag body 30 by turning inside out over their entirety through inflator mounting holes 30D defined in the fabric 30B. The interior-side fabric 30A and the exterior-side fabric 30B are sewn with sewing thread or strings 31 so as to enclose a portion of the airbag body 30, which corresponds to an arm rest 36 attached to the side door 32, for example (see FIG. 3). The portion corresponding to the arm rest 36, which has been enclosed by the strings 31, is of an uninflatable portion in which inflating gas cannot be introduced. Accordingly, the portion corresponding to the arm rest 36 is not expanded. Therefore, passages 30F narrow in width, which allow both sides of the uninflatable portion to communicate, are provided on both sides of the uninflatable portion (see FIG. 2).

Incidentally, the interior-side fabric 30A and the exterior-side fabric 30B of the airbag body 30 may be bonded to one another by bonding or other means so as to avoid the expansion of the portion corresponding To the arm rest 36. Further, the inner liner 34 may be reduced in thickness as compared with a normal door trim to facilitate the expansion of the airbag body 30. Furthermore, an easy-to-rupture portion may be provided so that opening or rupture easily occurs in a part of the inner liner 34. A plurality of easy-to-rupture portions may be provided.

When it is desired to attach the arm rest 36 to the side door 32, the arm rest 36 is placed in a predetermined position on the inner liner 34 of the side door 32. Bolts 38 are successively penetrated into the arm rest 36, the inner liner 34 and the airbag body 30 so as to be fastened to the innerpanel 33 of the side door 32 by weld nuts 40 or the like. Other parts can be attached to the side door 32 in the same manner as described above.

The airbag body 30 is mounted to the door innerpanel 33 by the inner liner 34 so as to be interposed between the door innerpanel 33 and the inner liner 34. However, a part of the airbag body 30 may be hooked and secured to the side door 32 with clips or the like. Injection nozzles of an inflator 42 are securely fitted to the inflator mounting holes 30D used for the introduction of gas into the airbag body 30 in advance. The inflator 42 is securely fitted in a concave portion or recess 33A defined in the door innerpanel 33. Since the inflator 42 is reduced in size and the airbag body 30 extends over the entirety of the side door 20, the inflator 42 can be provided at a desired position on the side door 32.

Further, straps 44, which couple between the interior-side fabric 30A and the exterior-side fabric 30B are provided within the airbag body 30 in the neighborhood of the injection nozzles of the inflator 42. The straps 44 are provided so that the airbag body 30 is set to a predetermined developed shape and expanded on the average as a whole. The inflator 42 is normally similar in structure to an inflator used for an airbag, which is provided with an acceleration sensor, a detonator, gas generating materials, an oxygen cylinder, etc. and attached to a steering wheel or a vehicle body provided in front of the assistant driver's seat. The inflator 42 produces a large quantity of gases under a predetermined acceleration or load and feeds them into the airbag body 30. Incidentally, the sensor may be located in another position of the vehicle as an alternative to the position in the inflator 42 so as to transmit a signal detected by the sensor to the detonator in the inflator 42.

It is preferable that when the airbag body 30 is expanded, the airbag body 30 is formed to such a size that it covers even a portion corresponding to a window 46 of the side door 32, and the portion of the airbag body 30, for covering the window 46 is folded near the window 46 of the side door 32 (not shown). Thus, since the airbag body 30 is disposed inside the inner liner 34 of the side door 32 in a state in which the major portion thereof exclusive of the portion corresponding to the window 46 has been developed, it is unnecessary to define a special space for accommodating the airbag body 30 therein in the side door 20 as compared with the case where the airbag body 30 is folded to a small size.

Figure 2:
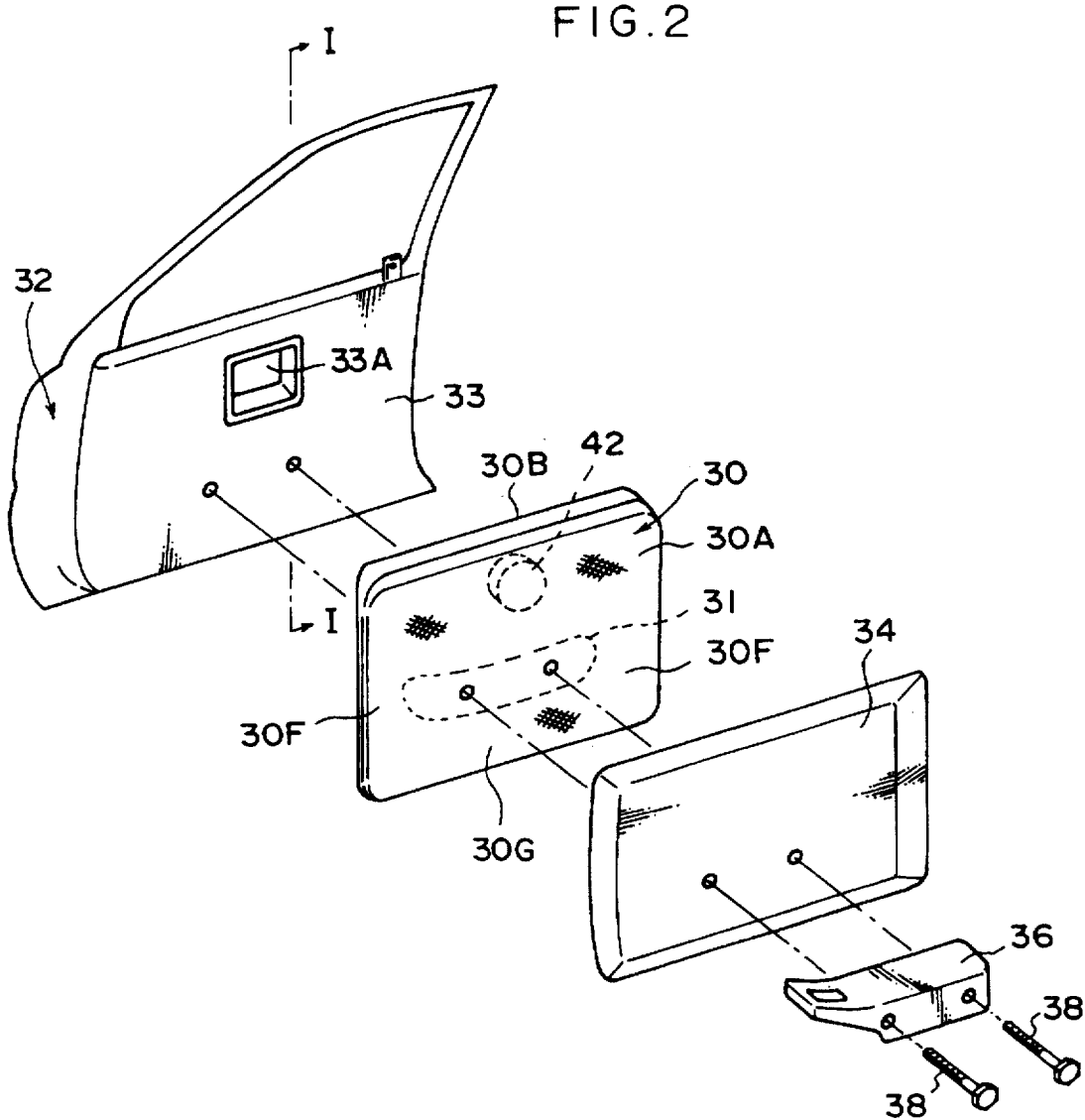
FIG. 2 is a perspective view illustrating a vehicle side door to which the side-impact airbag device shown in FIG. 1 is mounted.

Although the airbag body 30 has been shown in a state slightly expanded in the left and right directions as seen in FIG. 1, the airbag body 30 is actually disposed in a state contracted in the left and right directions as seen in FIG. 1.

When an abrupt load or acceleration is applied to the vehicle from its lateral side portion in operation, an unillustrated sensor detects it and the inflator 42 is activated. The gas injected from each injection nozzle of the inflator 42 is introduced into the airbag body 30 so as to pass through the narrow passages 30F defined between ends of the airbag body 30 as seen in the longitudinal direction of the vehicle and the portion corresponding to the arm rest 36, followed by flowing into a lower portion 30G of the airbag body 30. Further, the gas also flows into an upper folded portion of the airbag body 30 to develop the folded portion toward the portion corresponding to the window 46, so that the entire airbag body 30 is expanded on an average basis.

[Second embodiment]

Figure 3:
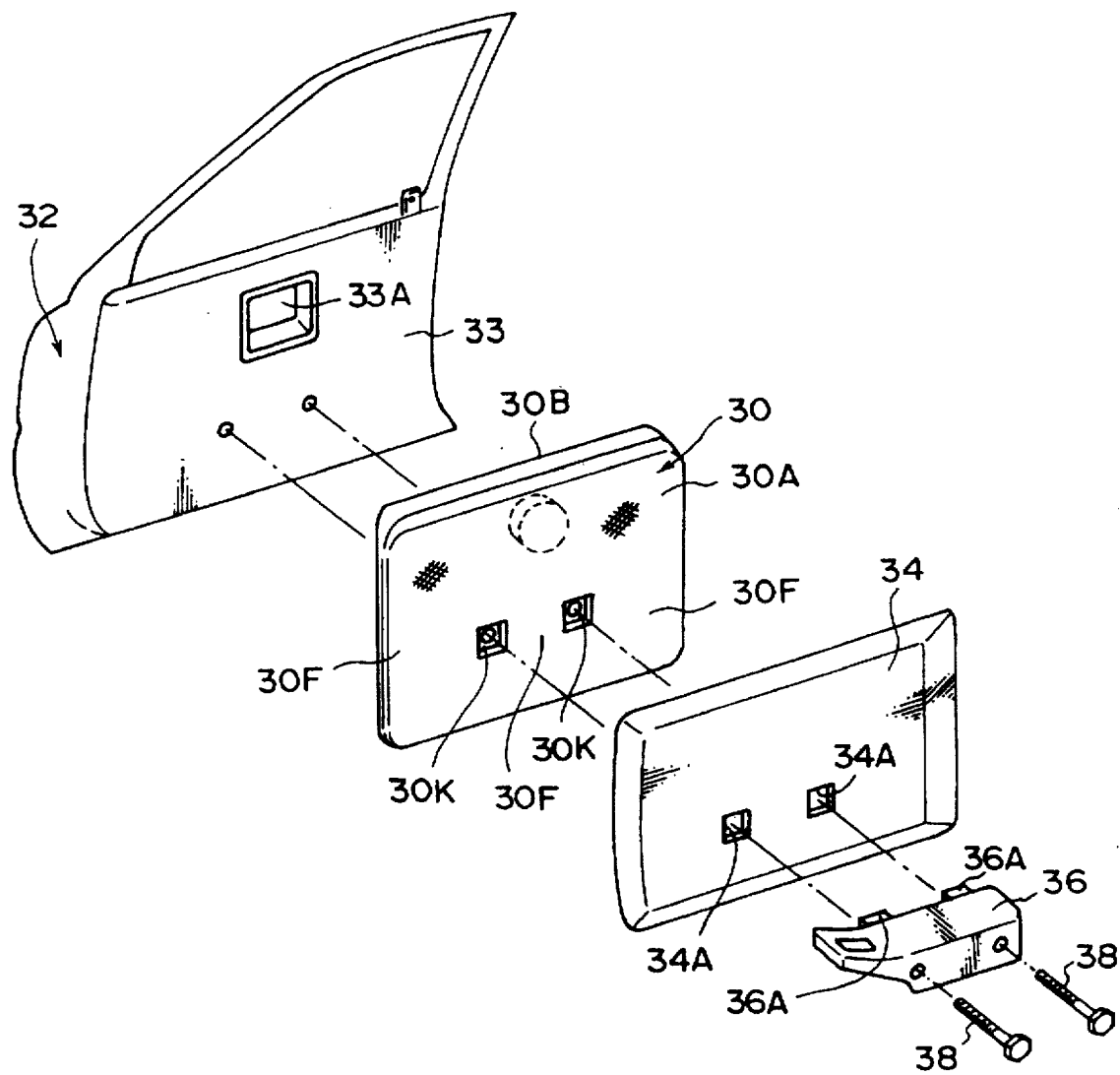
FIG. 3 is a perspective view showing a vehicle side door to which a side-impact airbag device according to a second embodiment of the present invention is mounted.
Figure 4:
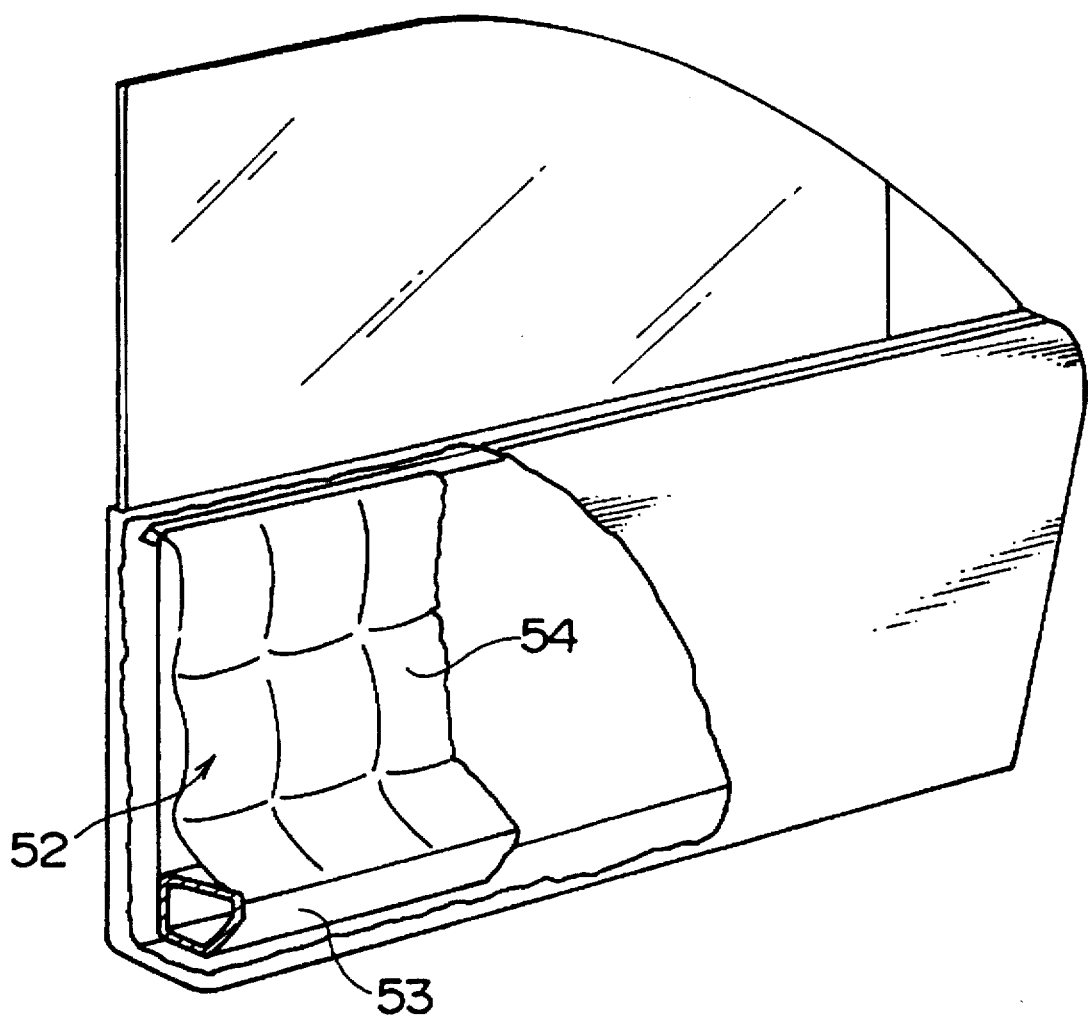
FIG. 4 is a perspective view depicting a conventional side-impact airbag system.

A second embodiment of the present invention will now be described with reference to FIG. 3. In the present embodiment, the strings 31 employed in the first embodiment are not provided. Further, bolts 38 are tightened to press projections 36A of an arm rest 36 against an airbag body 30 though through-holes 34A of an inner liner 34 and to press the airbag body 30 against a door panel 33, whereby uninflatable portions 30K obtained by bringing a fabric 30A provided on the interior side into intimate contact with a fabric 30B provided on the exterior side are formed in the airbag body 30. Therefore, passages 30F narrow in width are provided at three positions inclusive of a position between the pair of projections 36A in the present embodiment.

The present embodiment describes the attachment of the airbag device to the side door. It is however needless to say that the airbag device may be mounted to a side wall of a vehicle body or the like, which is other than the door. Further, an interior mounting part is not necessarily limited to the arm rest and can be widely applied even to a case where other parts such as various switches, a door glass up-and-down handle, etc. are mounted. It is unnecessary to narrow the passages which are provided on both sides of the interior mounting part and keep the inside of the airbag body in communication as compared with other parts as in the aforementioned embodiment. Further, the passages can be set to desired sizes by changing the entire shape of the airbag body.

Having now fully described the invention, it will be apparent to those skilled in the art that many changes and modifications can be made without departing from the spirit or scope of the invention as set forth herein.

What is claimed is:

1. A side-impact airbag device comprising:
   an expandable airbag body disposed on an interior-side surface of a vehicle side wall in a contracted state; and at least one uninflatable portion formed in said airbag body and disposed between an interior mounting part attached to the vehicle side wall and the interior-side surface of the vehicle side wall.

2. A side-impact airbag device according to claim 1 wherein said uninflatable portion is disposed between an interior surface-side end of the interior mounting part and the interior-side surface of the vehicle side wall.

3. A side-impact airbag device according to claim 1, wherein the at least one uninflatable portion is provided at a portion where a member for mounting the interior mounting part penetrates said airbag body.

4. A side-impact airbag device according to claim 3, wherein more than one uninflatable portion is provided.

5. A side-impact airbag device according to claim 1, wherein said airbag body has passages for allowing an inflating gas to pass from one side of said airbag body to another side thereof around said uninflatable portion.

6. A side-impact airbag device according to claim 5, wherein said passages are slender.

7. A side-impact airbag device according to claim 5, wherein said passages are provided adjacent to said uninflatable portion.

8. A side-impact airbag device according to claim 1, further comprising a cover for covering said airbag body.

9. A side-impact airbag device according to claim 8, wherein said cover covers a vehicle-interior side of said airbag body.

10. A side-impact airbag device according to claim 8, wherein the cover forms an inner liner of a side door of a vehicle.

11. A side-impact airbag device according to claim 8, wherein the cover is thin formed so as to facilitate inflation of said airbag body.

12. A side-impact airbag device according to claim 8, wherein the cover has at least one of an opening and a rupturable portion defined therein so as to facilitate inflation of said airbag body.

13. A side-impact airbag device according to claim 12, wherein more than one rupturable portion is provided.

14. A side-impact airbag device according to claim 1, wherein said airbag body has a fabric provided on a vehicle interior side and a fabric provided on a vehicle exterior side.

15. A side-impact airbag device according to claim 14, wherein peripheries of the two fabrics are bonded to one another so as to be shaped in the form of a bag.

16. A side-impact airbag device according to claim 14, wherein said uninflatable portion is provided at a position where the fabric provided on the vehicle interior side is brought into contact with the interior surface-side end of the interior mounting part.

17. A side-impact airbag device according to claim 14, wherein a central portion of the fabric provided on the vehicle interior side and a central portion of the fabric provided on the vehicle exterior side are bonded to one another so that the airbag body becomes uninflatable at the central portion.

18. A side-impact airbag device according to claim 17, wherein said bonding is sewing.

19. A side-impact airbag device according to claim 17, wherein said bonding is adhesion.

20. A side-impact airbag device according to claim 17, wherein inflating gas is introduced into a portion other than a portion where the fabric disposed on the vehicle interior side and the fabric disposed on the vehicle exterior side are bonded to one another.

21. A side-impact airbag device according to claim 14, further comprising strings which are provided in the neighborhood of a portion in which inflating gas is introduced between the two fabrics and which serve so as to inflate said airbag body on a substantially uniform basis.

22. A side-impact airbag device according to claim 1, wherein said airbag body covers a window of a vehicle side door when inflating gas flows to develop said airbag body.

23. A side-impact airbag device according to claim 22, wherein a portion of said airbag body, for covering the window is folded in the neighborhood of the window in advance.

24. A method of mounting said side-impact airbag device according to claim 10 to the interior-side surface of the vehicle side wall, said method comprising the steps of:

preparing the interior mounting part attached to the vehicle side wall at a predetermined position on the inner liner;

penetrating the members for mounting the interior mounting part into the inner liner and the uninflatable portion;

installing the interior mounting part on the vehicle side wall; and fixing said airbag body to the interior-side surface of the vehicle side wall.

25. A side-impact airbag device comprising:

an expandable airbag body disposed on an interior-side surface of a vehicle side wall in a contracted state; and at least one uninflatable portion formed in said airbag body and disposed between an interior mounting part attached to the vehicle side wall and the interior-side surface of the vehicle side wall, wherein said airbag body has a fabric provided on a vehicle interior side and a fabric provided on a vehicle exterior side;

a central portion of the fabric provided on the vehicle interior side and a central portion of the fabric provided on the vehicle exterior side are bonded to one another so that the airbag body becomes uninflatable at the central portion; and members for mounting the interior mounting part penetrate the portion where the fabric provided on the vehicle interior side and the fabric provided on the vehicle exterior side are bonded to one another.

\* \* \* \* \*